United States Patent
Manikantan

(10) Patent No.: US 11,343,242 B2
(45) Date of Patent: May 24, 2022

(54) DYNAMIC CONNECTION ACROSS SYSTEMS IN REAL-TIME

(71) Applicant: ADP, Inc., Roseland, NJ (US)

(72) Inventor: Jyotsna Manikantan, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 271 days.

(21) Appl. No.: 16/581,934

(22) Filed: Sep. 25, 2019

(65) Prior Publication Data

US 2021/0092113 A1    Mar. 25, 2021

(51) Int. Cl.
| | |
|---|---|
| *H04L 9/40* | (2022.01) |
| *H04W 12/06* | (2021.01) |
| *H04L 67/146* | (2022.01) |
| *H04L 67/141* | (2022.01) |
| *H04L 67/50* | (2022.01) |
| *H04W 12/63* | (2021.01) |

(52) U.S. Cl.
CPC ...... *H04L 63/0861* (2013.01); *H04L 63/0853* (2013.01); *H04L 67/141* (2013.01); *H04L 67/146* (2013.01); *H04L 67/22* (2013.01); *H04W 12/06* (2013.01); *H04W 12/63* (2021.01)

(58) Field of Classification Search
CPC ........ G06F 21/41; G06F 21/31; G06F 21/445; H04L 67/141; H04L 67/148; H04L 67/14; H04L 67/34; H04L 65/1066; H04L 65/1083; H04L 63/08; H04L 9/3213
See application file for complete search history.

(56) References Cited

U.S. PATENT DOCUMENTS

| | | | |
|---|---|---|---|
| 8,935,769 | B2 | 1/2015 | Hessler |
| 9,276,921 | B2 | 3/2016 | Birkler et al. |
| 9,288,198 | B2 | 3/2016 | DeSoto et al. |
| 10,050,952 | B2 | 8/2018 | Shi |
| 10,979,413 | B2 * | 4/2021 | Milligan ................. H04L 63/08 |
| 2013/0212286 | A1 * | 8/2013 | Krishnakumar .. H04L 29/06319 709/227 |
| 2014/0122730 | A1 * | 5/2014 | Burch ................. H04L 63/0807 709/228 |
| 2014/0173125 | A1 * | 6/2014 | Selvanandan ......... H04W 12/06 709/229 |
| 2014/0282923 | A1 * | 9/2014 | Narayan ............... H04W 12/64 726/5 |
| 2015/0244715 | A1 * | 8/2015 | Narayan ............... H04W 12/64 726/5 |

(Continued)

*Primary Examiner* — Tae K Kim
(74) *Attorney, Agent, or Firm* — Yee & Associates, P.C.

(57) ABSTRACT

Establishing a dynamic connection across systems is provided. The method comprises receiving user login credentials from a user from a first device and authenticating the user login credentials in connection with a user account. A session is created in response to successful authorization of the user login credentials, wherein the session comprises a session state that tracks user activity and any changes to a user account during the session, and the first device is bound to the session state and saved as a known device. Upon detecting activity of the user on a second device, a quick response code is created for the user. When the user inputs the quick response code from the second device, the second device is bound to the session state and logged into the session with the session state preserved.

24 Claims, 9 Drawing Sheets

(56) References Cited

U.S. PATENT DOCUMENTS

| | | | |
|---|---|---|---|
| 2015/0296027 A1* | 10/2015 | Bak | H04L 67/2804 |
| | | | 709/202 |
| 2016/0219039 A1 | 7/2016 | Louthooft et al. | |
| 2017/0244555 A1* | 8/2017 | Beiter | G06K 19/06028 |
| 2019/0068686 A1* | 2/2019 | Vaananen | H04L 63/062 |
| 2019/0173540 A1 | 6/2019 | Kotecha et al. | |
| 2019/0313470 A1* | 10/2019 | Milligan | H04L 63/08 |

* cited by examiner

DYNAMIC CONNECTION ACROSS SYSTEMS IN REAL-TIME

BACKGROUND INFORMATION

1. Field

The present disclosure relates generally to an improved computer system and, in particular, to creating and maintaining a dynamic connection across systems in real-time with the user of quick response codes that preserve session states and bind multiple devices to the session state.

2. Background

Many products, services, and applications are supported on multiple platforms such as website access through browsers on desktop and laptop computers and mobile devices, as well as specialized mobile applications for mobile phones and tablet computers. Each of these different access methods typically has its own login features and operates in isolation from the other access routes.

Quick Response (QR) code is a two-dimensional, machine-readable matrix barcode that stores data. QR codes often include an identifier, locator, or tracker that points to a website or application.

SUMMARY

An illustrative embodiment provides a computer-implemented method for establishing a dynamic connection across systems. The method comprises receiving user login credentials from a user from a first device and authenticating the user login credentials in connection with a user account. A session is created in response to successful authorization of the user login credentials, wherein the session comprises a session state that tracks user activity and any changes to a user account during the session, and the first device is bound to the session state and saved as a known device. Upon detecting activity of the user on a second device, a unique and dynamic quick response code is created for the user. When the user inputs (scans from screen, email, text message) the quick response code from the second device, the second device is bound to the session state and logged into the session with the session state preserved.

Another illustrative embodiment provides a system for establishing a dynamic connection across systems. The system comprises a number of bus systems, a number of storage devices connected to the number of bus systems, wherein the number of storage devices store program instructions, and a number of processors connected to the number of bus systems, wherein the number of processors execute the program instructions to: receive user login credentials from a user from a first device; authenticate the user login credentials in connection with a user account; create a session in response to successful authorization of the user login credentials, wherein the session comprises a session state that tracks user activity and any changes to a user account during the session; bind the first device to the session state; save the first device as a known device; detect activity of the user on a second device; create a quick response code for the user; receive input of the quick response code by the user from the second device; in response to input of the quick response code, bind the second device to the session state; and log the second device into the session with the session state preserved.

Another illustrative embodiment provides a computer program product for establishing a dynamic connection across systems. The computer program product comprises a number of non-volatile computer readable storage media having program instructions embodied therewith, the program instructions executable by a number of processors to cause a number of computers to perform the steps of: receiving user login credentials from a user from a first device; authenticating the user login credentials in connection with a user account; creating a session in response to successful authorization of the user login credentials, wherein the session comprises a session state that tracks user activity and any changes to a user account during the session; binding the first device to the session state; saving the first device as a known device; detecting activity of the user on a second device; creating a quick response code for the user; receiving input of the quick response code by the user from the second device; in response to input of the quick response code, logging the second device into the session; and binding the second device to the session state with the session state preserved.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
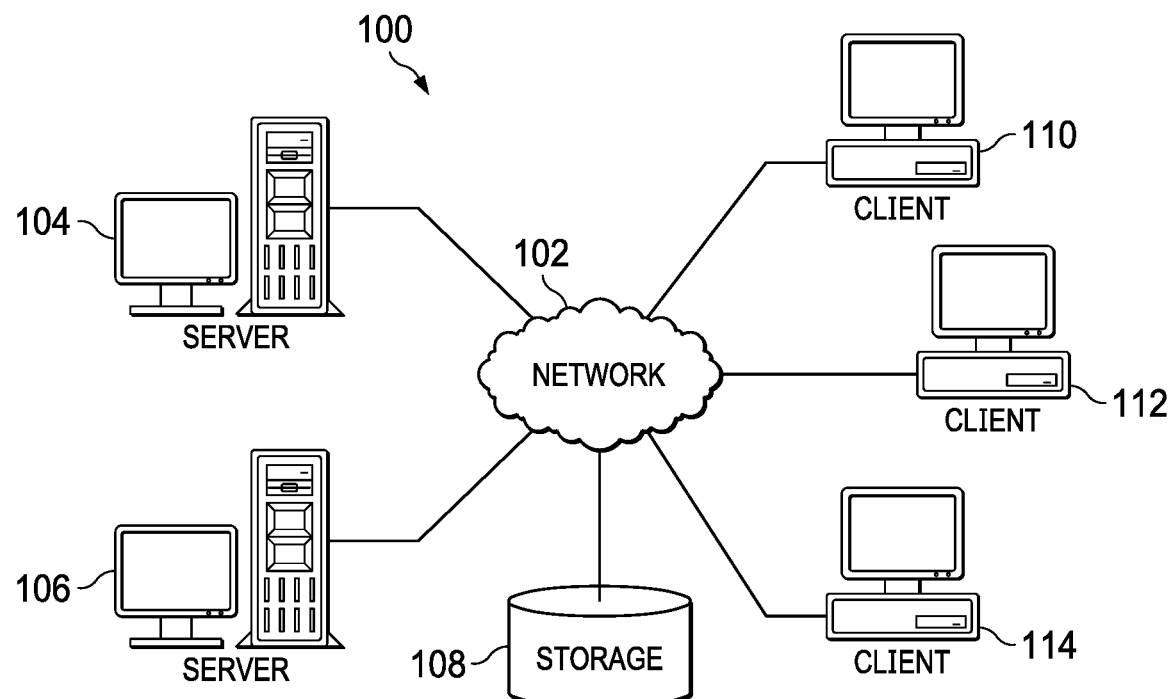
FIG. 1 is an illustration of a block diagram of an information environment in accordance with an illustrative embodiment.

The illustrative embodiments recognize and take into account one or more different considerations. For example, the illustrative embodiments recognize and take into account that many products and applications are supported by web browsers mobile applications that have different login features and operate in isolation from each other. Users often lose time and productivity determining which access methods are available and how to access them. For example, users might be familiar with a product or service website but might not be aware there is an application specific for mobile devices such as smart phones and tablet computers.

The illustrative embodiments further recognize and take into account that separate login and authentication procedures between different platforms results in lost productivity time because web and mobile experiences are often mutually exclusive. For example, for website access, a user might visit a URL for a service and enter a user ID and password to log in. Many companies might have a single sign-on enabled by clicking a link on a company portal. However, a corresponding mobile application for the same service might not support single sign-on. The resulting disjointed user experiences is not user friendly nor business friendly, which can result in less users adopting or continuing to use the mobile application.

The illustrative embodiments further recognize and take into account that no solution to connect different device types to a common user account. The problem can be at least partially attributed to lack of smart shortcuts that connect multiple devices/systems for users who routinely switch back and forth between website and mobile application access.

Illustrative embodiments provide a method and system for establishing a dynamic connection across systems. Upon user registration and successful verification with a website service, the service/application creates a unique sign-in for the user as during login and then creates a dynamic Quick Response (QR) code associated with the session login. The QR code can be displayed to the user on the landing/logged-in page of the website with user-specific, product-specific, and device-specific information, along with country, language, and locale-related information.

The QR code can act as a connector that can display current device information and provide visual guidance to the user regarding alternate access points. For example, after signing into a website application, the QR code can be scanned with a camera on a mobile device such as a phone or tablet computer to transfer the current authentication of the website login to the mobile device without the need to reauthenticate the login credentials.

In an illustrative embodiment, for devices on the same operating system (e.g., iOS and Mac), the proximity sensor can detect the dynamic QR code and present it on the alternate device for faster sign-in/login.

By having varying validity of the dynamic "smart validity" attribute, users will remain signed into at least device, which facilitates connections across systems/devices. In an embodiment, if a time lapse is long enough to inactivate a session, the action of scanning and activating the QR code on a user interface can reset the clock and reactivate the session without having to manually log in again.

By leveraging a pre-authentication device signature and dynamic QR code/connector, users can remain signed in on select devices in close proximity (sensor), while having the option to quickly block access to a specified device from any account.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, smart phone, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
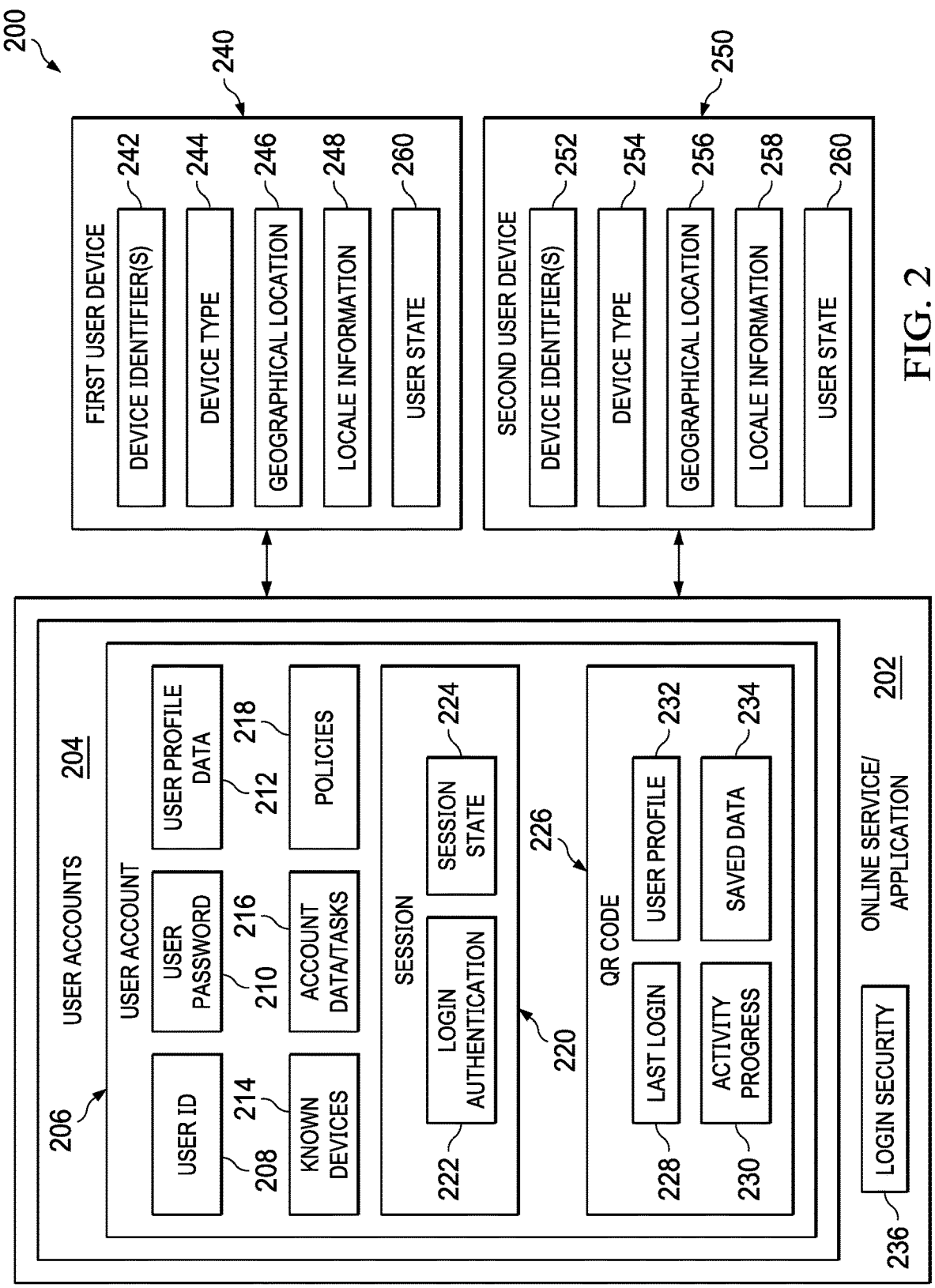
FIG. 2 is a block diagram of a computer system for establishing a dynamic connection across systems in accordance with an illustrative embodiment.

Turning to FIG. 2, a block diagram of a computer system for establishing a dynamic connection across systems is depicted in accordance with an illustrative embodiment. System 200 can be implemented using elements of a network data processing system such as system 100 shown in FIG. 1. For example, online service/application 202 might be implemented using a server such as server 140. First and second user devices 240, 250 might comprise client devices such client 110 and 112 and might take the form of desktop or laptop computers, smarts phones, or tablet computers.

Online service/application 202 might include a number of user accounts 204, access to which is mediated through login security 236.

Each user account 206 within the number of user accounts 204 can a unique user identification (ID) 208 and user password 210. Depending on the nature of online service 202, user account 206 might also include user profile data 212 comprising personal and/or professional information about the user and user preferences regarding the account and/or service.

User account 204 might also include a list of known devices 214 used by the user. Known devices 214 can be identified and linked to user account 206 in a number of ways. For example, identifying user device information might include, without limitation, device make name, model name, serial number, device type (e.g., laptop, desktop, watch, phone, tablet, etc.), network carrier, Wi-Fi address, device Bluetooth® information, International Mobile Equipment Identity (IMEI), Integrated Circuit Card Identifier (ICCID), software update version, and certificate trust log.

User account 206 might also include account data and tasks associated with or resulting from user activity on the account. As account data/tasks 216 change during a user session, the updated data is saved according to policies 218.

When the user successfully logs into user account 206 through login security 236, session 220 is created. Session 220 includes a successful login authentication 222 and a session state 224 that user activity, task progress, and data changes while the user is in session on user account 206.

The user accesses online service 202 and user account 206 using a first user device 240 to log in through login security 236. After successful login, the first user device 240 is identified according to device identifier(s) 242, which can comprise a number of the identifying device information discussed above. If the first user device 240 is not already included in the list of known devices 214 (e.g. first-time login), the device ID(s) 242 can be preserved and the device added to the list stored on a server associated with online service 202 such as, e.g., server 104 in FIG. 1. First user device 240 is also bound to the session state 224, and a corresponding user state 260 is loaded onto the device.

First user device comprises a device type 244, which can include, for example, desktop or laptop computer, mobile phone, smart watch, tablet computer, or any internet enabled device. Online service/application 202 can use the device type 244 to determine the method of access (e.g., desktop web browser vs. mobile application) and the best way to display to the service. Other information about the user/device current state such as geographical location 246 and information about the locale 248 might affect how the online service is provided or customized for the user.

Upon detection of user activity on a second user device 250, the online service/application 202 can create a QR code 226 corresponding to the current user session 220, successful login authentication 222, and session state 224. The QR code 226 saves the last login 228, current activity progress 230, user profile information 232, and saved data during the session 234. Stated more simply, the QR code 226 creates an operational snapshot of session 220 to allow the user to pick up on the second device 250 right where the user left off with the first device 240.

QR code 226 can be provided to the user in a number of different ways, explained in more detail below. Upon entry of QR code 226, the same user state 260 that is loaded on the first device 240 is loaded onto the second device 250, thereby binding the second device 250 to session state 224, allowing the user to continue the session 220 on the second device 250 uninterrupted.

If the second user device 250 is one of known devices 214, the user is automatically logged into session 220 because the last authenticated login 228 is include in QR code 226. If the second device 250 is not known to online application 202, an additional step of user verification is required (explained below) before login to the existing session 220 is complete. Afterwards, device identifier(s) 252 can be preserved and the second device 250 added to the list of known devices 214 for future use. For a given session, the geographical location 256 and locale information 258 of second device 250 should be identical to that of the first device 240, but the device type 254 might be different (e.g., mobile phone versus laptop), necessitating a difference in how the service/application 202 is presented and functions relative to the device.

Figure 3:
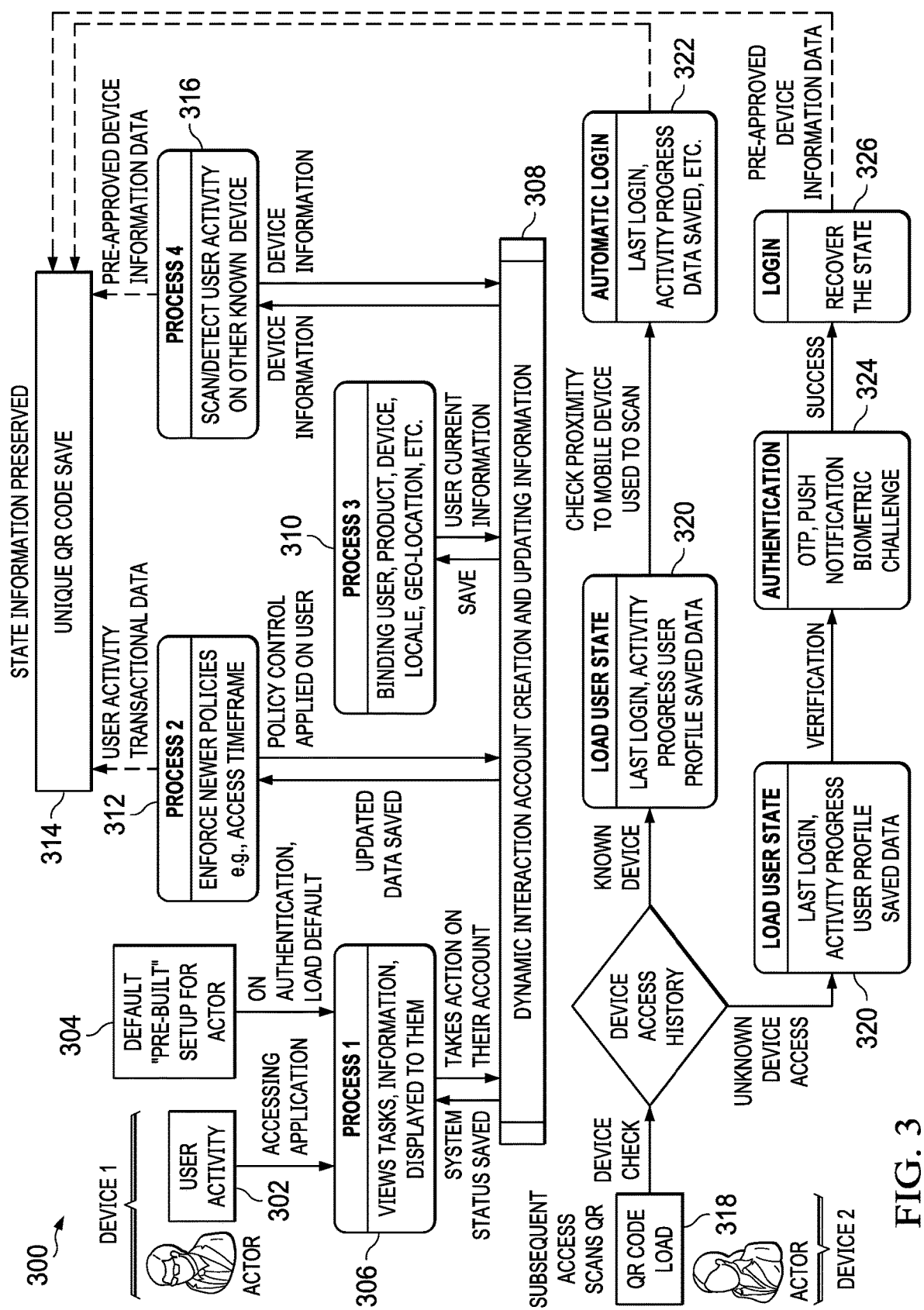
FIG. 3 is a block diagram illustrating how dynamic connection might operate in accordance with illustrative embodiments.

FIG. 3 is a block diagram illustrating how a dynamic connection across systems might operate in accordance with illustrative embodiments. Process 300 might be implemented using the system elements illustrated in FIG. 2. It should be emphasized that FIG. 3 illustrates operational relationships between system elements and processes and does not necessarily denote a sequential series of steps.

Upon successful login by a user, the device is bound to the application by process 3 310, which includes associated with the user, device product information, as well as locale, geographical location, etc. This user information is used during dynamic interaction 308 with the online application such as during initial account creation and subsequent account information updates due to user activity 302. User activity might comprise data entries associated with the application function (e.g., dates, monetary amounts, name lists, inventory, product details, etc.) or changes to user profile details.

Upon initial login and account creation the system might load a default "pre-built" setup 304 for the user, which is displayed to the user as part of Process 1 306. This default set-up 304 is effectively a "blank canvas" used for initial account creation that the user can customize as the user sets up the account and interacts with the application.

After loading the default setup 304, user activity 302 in accessing the application can occur through Process 1 306 to execute tasks and view and update information related to the account. User activity 302 with the application through Process 1 306 is used to update the account information through dynamic interaction 308.

As updated data from user activity (e.g., data entries or updates) is saved to the user account newer policies, e.g., access timeframes, are enforced on the user by Process 2 312. Process 2 312 also supplies user activity transaction data to QR code save operation 314 to preserve session state information. The QR code save operation 314 is a dynamic ongoing process that continuously preserves and refreshes updated session state data.

If user activity is detected or scanned on another known device by Process 4 316, pre-approved device information is also added to QR code save operation 314. With this pre-approved device data as part of the QR code, the second device can be automatically logged into the session once the QR code is entered through the device.

Subsequent scan or entry of the QR code initiates QR-code load operation 318 on the new device. Upon loading of the QR code, the user state 320 is loaded onto the new device. This user state includes the last login, activity progress, user activity, and saved data that are part of the preserved session state information linked to the QR code by QR code save operation 314. Loaded user state 320 thereby binds the new device to the most recent version of the session state. Preserving the session state with the dynamic QR code save 314 enables dynamic refresh for real-time contextual QR code load 318.

If the new device is a previously known device, the new device is then automatically logged in 322 to the session. If the new device is not known, an addition user authentication 324 is performed to ensure that it is in fact the same user using the new device. The user authentication 324 might take the form of a one-time password (OTP), push notification, or biometric challenge, or similar verification methods. This additional user authentication 324 might comprise a prompt to which the user responds or approves via the first (known) device.

If user authentication on the new device is successful, login 326 is then completed, and the new device is added to the list of known devices for the user.

After successful login with the new device, all activity on the account made through the new device is also preserved by the QR code save operation 314. In this manner, the QR code save 314 serves as a central hub to dynamically update and preserve a common session state in real-time across all user devices logged into the user account session.

Figure 4:
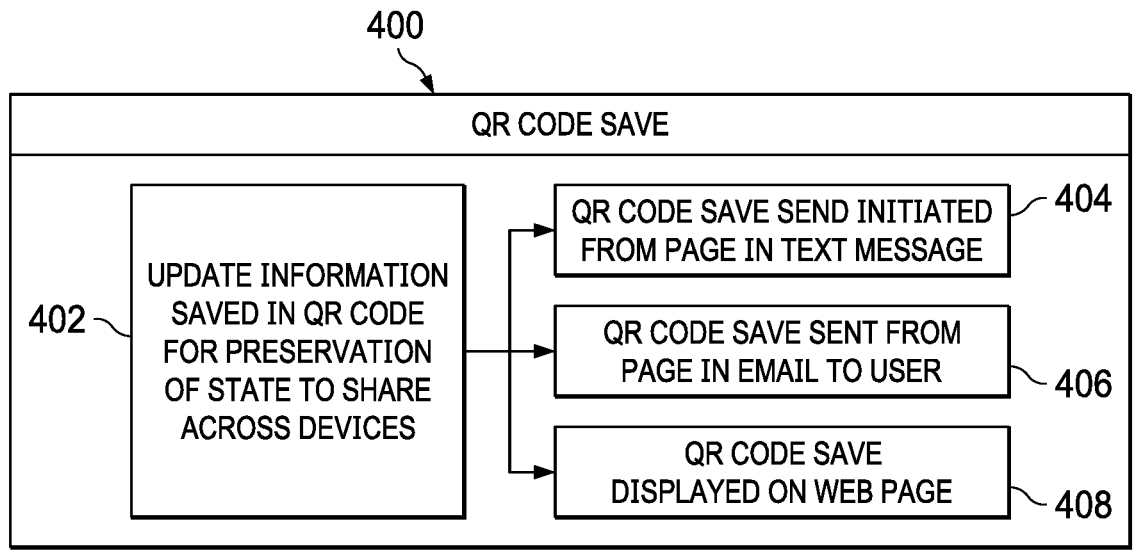
FIG. 4 illustrates a process flow of a QR code save operation in accordance with illustrative embodiments.

FIG. 4 illustrates a process flow of a QR code save operation in accordance with illustrative embodiments. QR code save operation 400 dynamically preserves and refreshes session state information including login authentication and data already entered during the session and is an example of QR code save 314 in FIG. 3. Updated account information is saved in the QR code for preservation of the session state to share across user devices (step 402). The QR code can be shared in a number of different ways.

Figure 7:
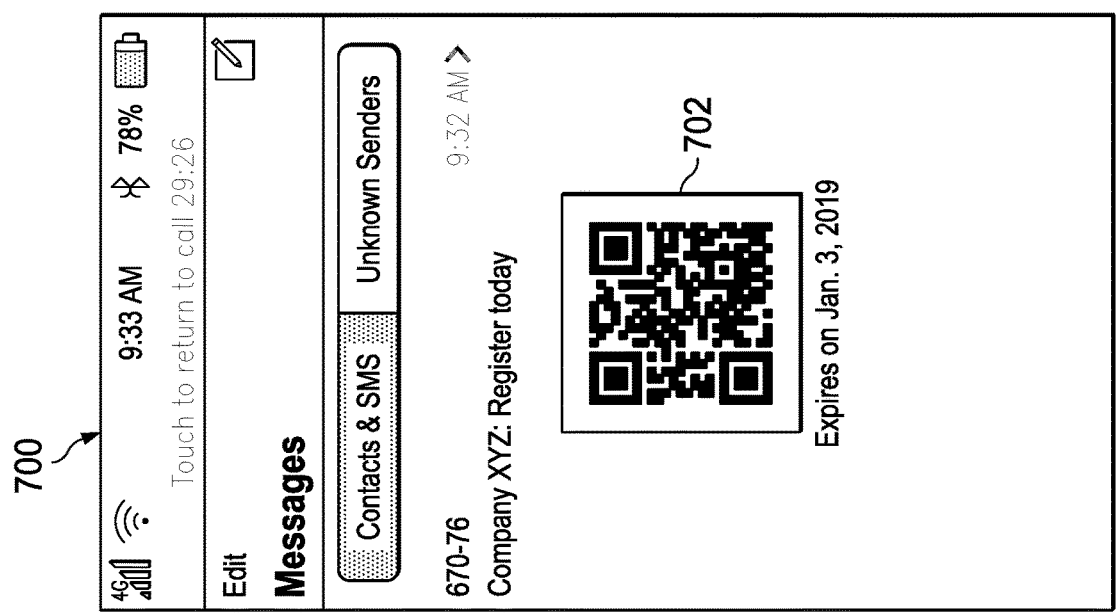
FIG. 7 illustrates an example QR code provided to a user via text message in accordance with illustrative embodiments.

In one method, the QR code is sent in a text message (step 404) (see, e.g., FIG. 7). In an alternate method, the QR code is sent in an email to the user (step 406) (see, e.g., FIG. 8). The QR code can also be displayed on a web page (step 408) (see, e.g., FIG. 9). It should be emphasized that the alternate methods of delivering the QR code in steps 404, 406, and 408 are not necessarily mutually exclusive. All could be used concurrently, with the choice of entry method left to the user according to the convenience of the moment.

Figure 5:
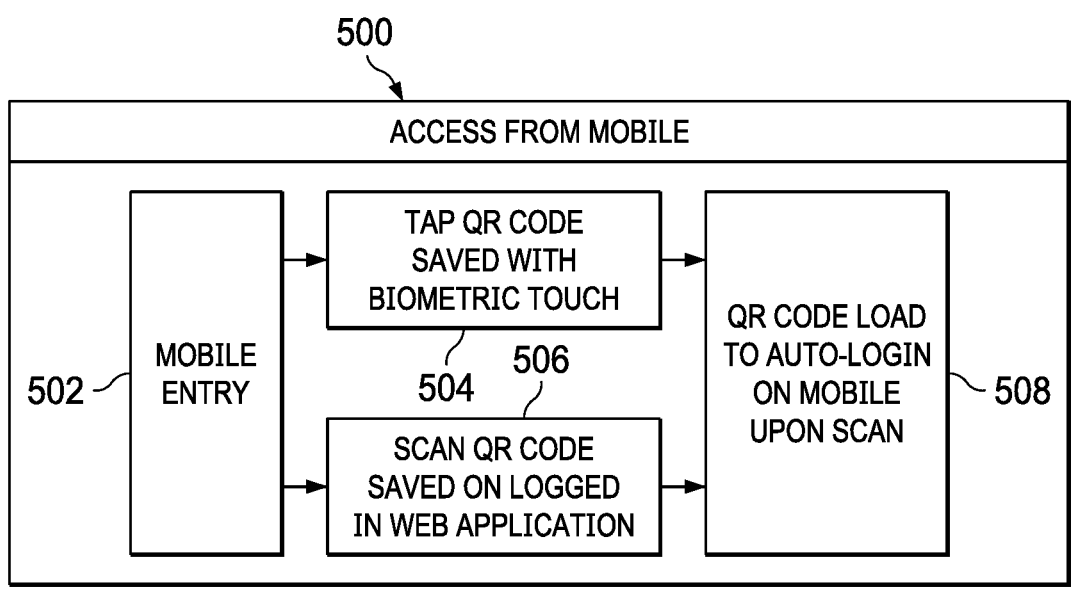
FIG. 5 illustrates a process flow of a QR code load operation from mobile devices in accordance with illustrative embodiments.

FIG. 5 illustrates a process flow of a QR code load operation from mobile devices in accordance with illustrative embodiments. Process 500 is an example of QR code load 318 in FIG. 3. Mobile QR code load process 500 comprises sending the QR code to a mobile device for entry (step 502). As depicted in FIG. 4, this delivery can use alternate methods. In the case of a text message or email delivery, the QR code displayed in the message can be saved by tapping or touching the code (step 504).

Alternatively, if the user is accessing a mobile web application the QR code can be displayed in the application (step 506). In such a case the displayed QR code can be scanned using the first logged in device. For example, the user might use a web camera on a laptop to scan the QR code displayed in the mobile application on a smart phone, smart watch, or tablet computer.

Upon tapping or scanning the QR code, the code is loaded on the mobile device, and for known devices, the user is automatically logged into the session with the preserved state (step 508). For unknown devices, recovery of preserved state is allowed after further authentication of user identity.

Figure 6:
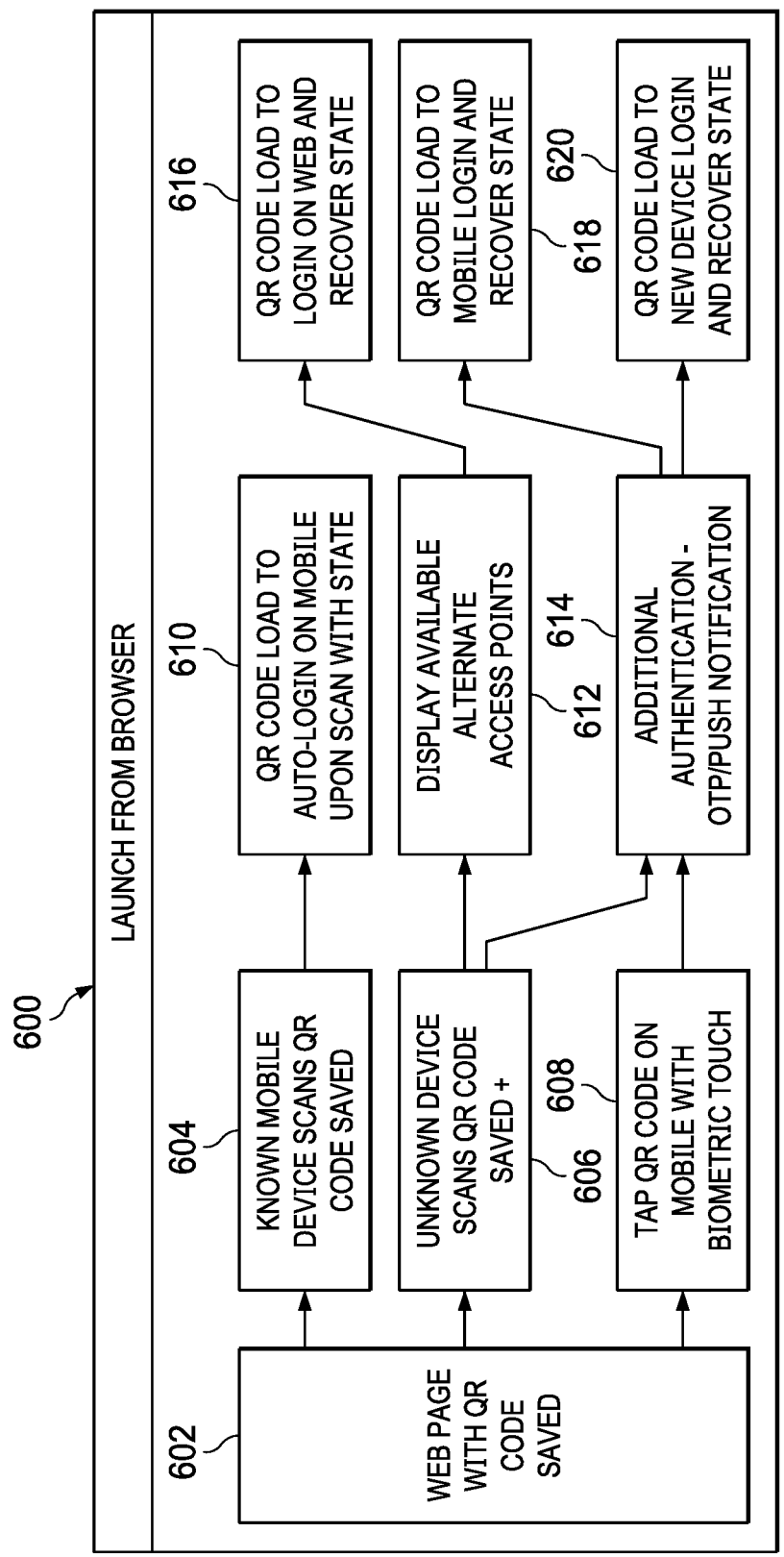
FIG. 6 illustrates a process flow of a QR code load operation from a web browser in accordance with illustrative embodiments.

FIG. 6 illustrates a process flow of a QR code load operation from a web browser in accordance with illustrative embodiments. Process 600 is an example of QR code load 318 in FIG. 3. Process 600 can be used when the QR code is launched from a traditional web browser rather than a specialized mobile application. A web page showing the saved QR code is displayed in the browser (step 602). Depending on the new device in question, the QR code displayed on the web page can be entered in a number of ways.

A known mobile device, for example, can scan the QR code on the web page (step 604), which loads the QR code on the mobile device and automatically logs in the user with the preserved stated (step 610).

If an unknown device scans the QR code from the web page (step 606), process 600 has two possible options. One is to display available alternate access point (step 612) from which the QR code can be loaded to log in on the Web and recover the preserved state (step 616). Alternatively, an additional authentication (as described above in FIG. 3) can be presented to the user (step 614). After successful authorization, the QR code might load to a dedicated mobile application on the device and log in with the preserved state (step 618), or the QR code can load to the new device through the browser and log in the user with the preserved state (step 620).

If the web page is displayed on a web browser of device with a touch screen, the user can tap the QR code with a biometric touch (step 608), which will prompt additional authentication (step 614). Again, after successful authorization, the QR code might load to a dedicated mobile application on the device and log in with the preserved state (step 618), or the QR code can load to the new device through the browser and log in the user with the preserved state (step 620).

FIG. 7 illustrates an example QR code provided to a user via text message in accordance with illustrative embodiments. In this example, QR code 702 is provided to the user in text message 700.

Figure 8:
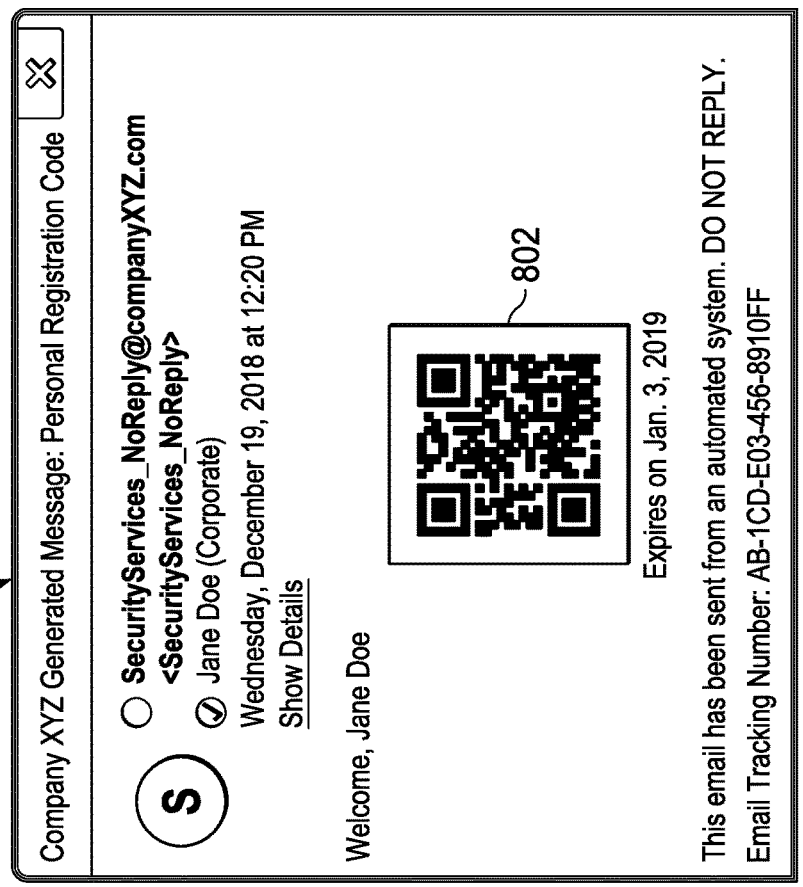
FIG. 8 illustrates an example QR code provided to a user via email in accordance with illustrative embodiments.

FIG. 8 illustrates an example QR code provided to a user via email in accordance with illustrative embodiments. In this example, QR code 802 is provided to the user in email message 800.

Figure 9:
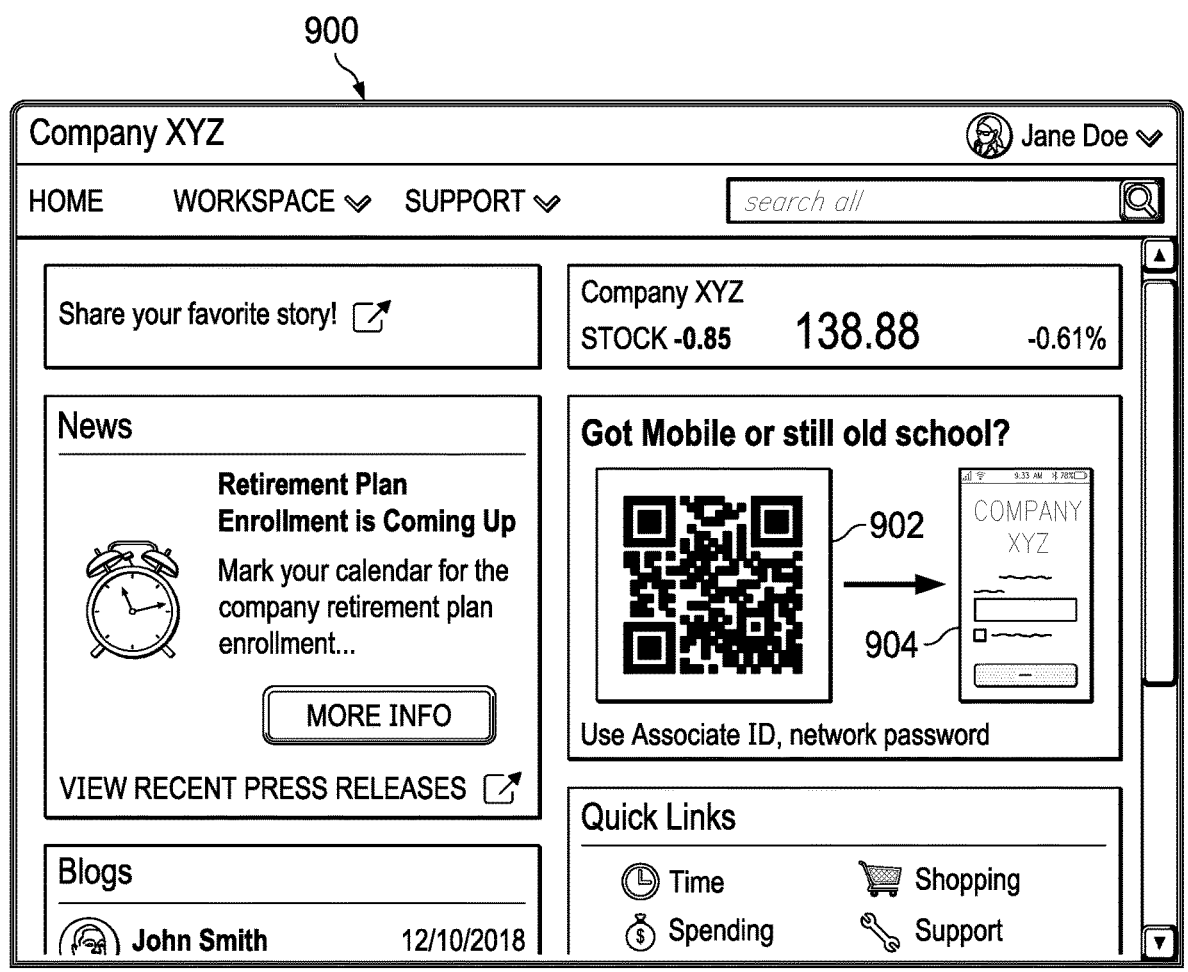
FIG. 9 illustrates an example QR code displayed on a web page in a browser in accordance with illustrative embodiments.

FIG. 9 illustrates an example QR code displayed on a web page in a browser in accordance with illustrative embodiments. In this example, the QR code 902 is displayed on web page 900. The user is provided with the option of scanning the QR code 902 with another device or having the QR code send to a mobile device by choosing selector 904.

It should be noted that QR codes 702, 802, and 902 might be the same code delivered three different ways.

Figure 10:
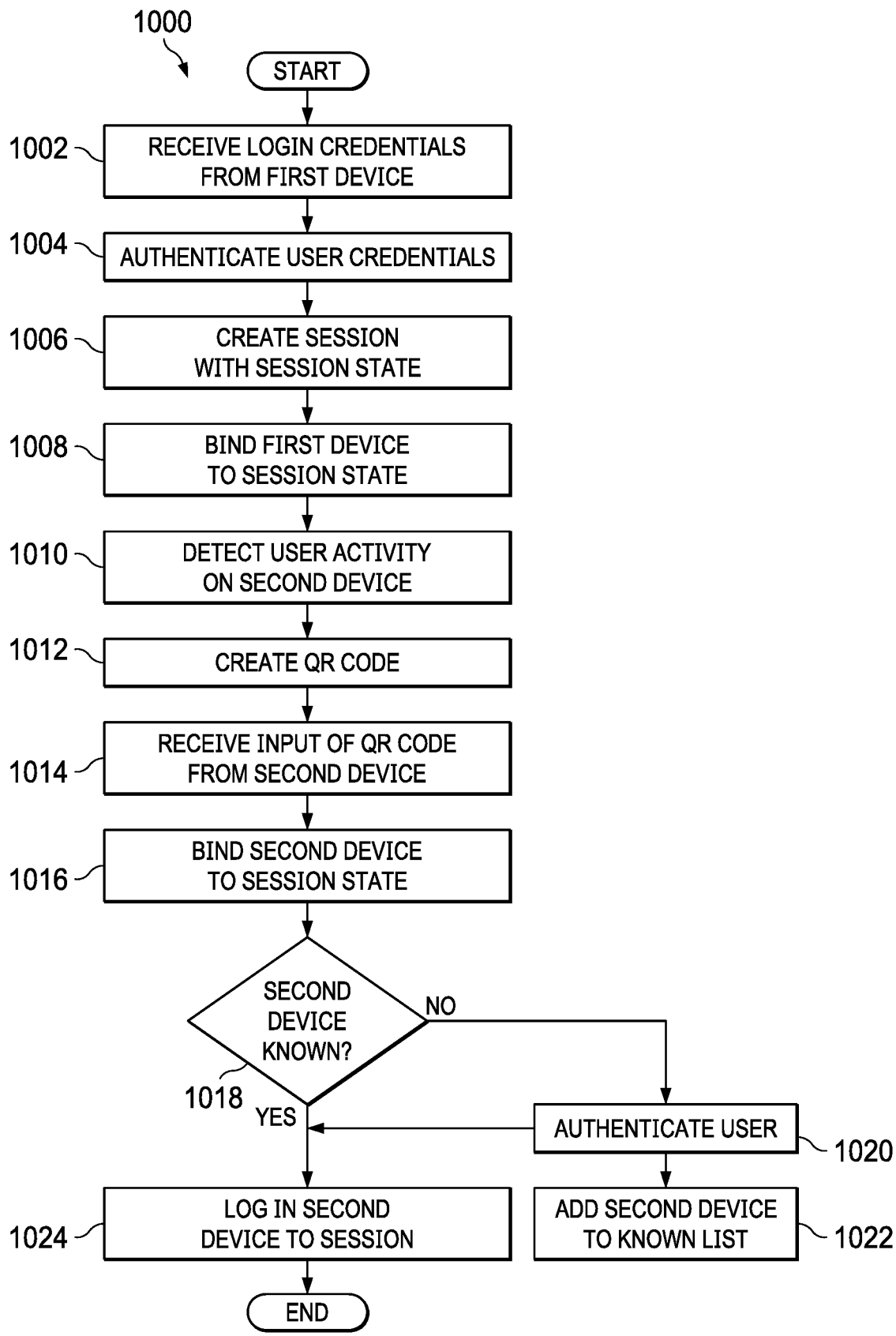
FIG. 10 illustrates a flowchart of a process for establishing a dynamic connection across systems in accordance with an illustrative embodiment.

FIG. 10 depicts a flowchart illustrating a process for establishing a dynamic connection across systems in accordance with an illustrative embodiment. Process 1000 can be implemented using elements of a computer system such as system 200 shown in FIG. 2.

Process 1000 begins by receiving user login credentials from a user from a first device (step 1002) and authenticating the user credentials in connection with a user account (step 1004).

After successful authentication and login, the application creates a session comprising a session state that tracks user activity and any changes to a user account during the session (step 1006). The first device is then bound to the session state and saved as a known device (step 1008). In the case where the login is the first ever for the user (i.e. account creation), the first device becomes the first known device saved to the user account.

If the application detects activity of the user on a second device (step 1010), the application creates a QR code that preserves session state information including user login and any data entered by the user and provides the QR code to the user (step 1012).

In response to receiving input of the quick response code by the user from the second device (step 1014), the application binds the second device to the session state (step 1016). The application then determines if the second device is a known device (step 1018). If the second device is already known to the application, the second device is logged into the session with the session state preserved (step 1024). The process terminated thereafter.

If the second device is unknown, the application authenticates the user identity before logging the second device into the session (step 1020). This authentication might comprise use of, e.g., a one-time password, a push notification, or a biometric challenge presented to the user via the first (known) device. After successfully authenticating the identity of the user of the second (previously unknown) device, the second device is logged into the session with the session state recovered (step 1024), and the second device is added to a list of known devices associated with the user account (step 1022). The process terminates thereafter.

Figure 11:
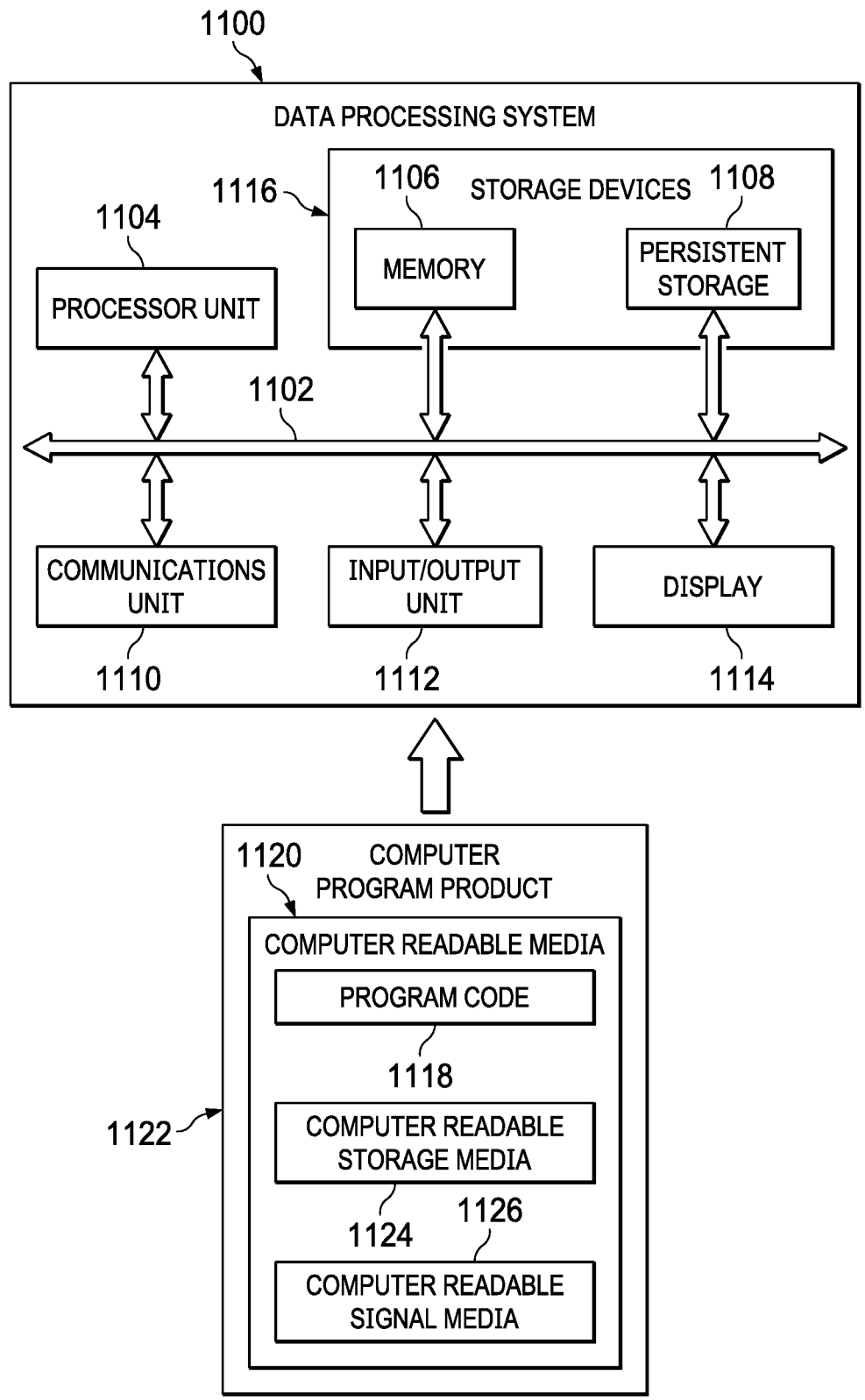
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more computers in network data processing system 100 in FIG. 1. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general purpose central processing units (CPUs). In an alternate embodiment, processor unit 1104 comprises a number of graphical processing units (CPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Alternatively, program code 1118 may be transferred to data processing system 1100 using computer-readable signal media 1126.

Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for establishing a dynamic connection across systems, the method comprising:
using a number of processors to perform the steps of:
receiving user login credentials from a user from a first device;
authenticating the user login credentials in connection with a user account;
creating a session in response to successful authorization of the user login credentials, wherein the session comprises a session state that tracks user activity and any changes to the user account during the session;
binding the first device to the session state;
saving the first device as a known device;
detecting, via proximity sensor data, activity of the user on a second device;
responsive to detecting the activity on the second device, creating a quick response code for the user;
receiving input of the quick response code by the user from the second device;
in response to input of the quick response code, binding the second device to the session state;
logging the second device into the session with the session state preserved; and
maintaining a common session state in real-time across the first device and second device logged into the session by updating the quick response code on all user devices logged into the session.

2. The method of claim 1, wherein detecting the user activity on the second device further comprises:
determining the proximity of the second device to the first device;
determining, if the second device is known; and
if the second device us unknown, authenticating, user identity before logging the second device into the session.

3. The method of claim 2, wherein authenticating the user identity for the second device comprises at least one of:
one-time password;
push notification; or
biometric challenge.

4. The method of claim 1, wherein the quick response code preserves session state information including user login and any data entered by the user.

5. The method of claim 1, wherein the quick response code is provided to the user by at least one of:
providing the quick response code in a text message;
providing the quick response code in an email message; or
displaying the quick response code on a web page.

6. The method of claim 1, wherein input of the quick response code from the second device comprises scanning the quick response code with a camera connected to the second device.

7. The method of claim 1, wherein input of the quick response code from the second device comprises tapping the quick response code with a biometric touch.

8. The method of claim 1, wherein if a time lapse is long enough to inactivate the session, scanning and activating the QR code on a user interface resets a clock and reactivates the session without having to manually log in again.

9. A system for establishing a dynamic connection across systems, the system comprising:
a number of bus systems;
a number of storage devices connected to the number of bus systems, wherein the number of storage devices store program instructions; and
a number of processors connected to the number of bus systems, wherein the number of processors execute the program instructions to perform the steps of:
receive user login credentials from a user from a first device;
authenticate the user login credentials in connection with a user account;
create a session in response to successful authorization of the user login credentials, wherein the session comprises a session state that tracks user activity and any changes to the user account during the session;
bind the first device to the session state;
save the first device as a known device;
detect, via proximity sensor data, activity of the user on a second device;
responsive to detecting the activity on the second device, create a quick response code for the user;
receive input of the quick response code by the user from the second device;
in response to input of the quick response code, bind the second device to the session state;
log the second device into the session with the session state preserved; and
maintain a common session state in real-time across the first device and second device logged into the session by updating the quick response code on all user devices logged into the session.

10. The system of claim 9, wherein detecting the user activity on the second device further comprises the number of processors executing program instructions to:
determine the proximity of the second device to the first device;
determine if the second device is known; and
if the second device us unknown, authenticate user identity before logging the second device into the session.

11. The system of claim 9, wherein authenticating user identity for the second device comprises at least one of:
one-time password;
push notification; or
biometric challenge.

12. The system of claim 9, wherein the quick response code preserves session state information including user login and any data entered by the user.

13. The system of claim 9, wherein the quick response code is provided to the user by at least one of:
providing the quick response code in a text message;
providing the quick response code in an email message; or
displaying the quick response code on a web page.

14. The system of claim 9, wherein input of the quick response code from the second device comprises scanning the quick response code with a camera connected to the second device.

15. The system of claim 9, wherein input of the quick response code from the second device comprises tapping the quick response code with a biometric touch.

16. The system of claim 9, wherein if a time lapse is long enough to inactivate the session, scanning and activating the QR code on a user interface resets a clock and reactivates the session without having to manually log in again.

17. A computer program product for establishing a dynamic connection across systems, the computer program product comprising:
a number of non-volatile computer readable storage media having program instructions embodied therewith, the program instructions executable by a number of processors to cause a number of computers to perform the steps of:
receiving user login credentials from a user from a first device;
authenticating the user login credentials in connection with a user account;
creating a session in response to successful authorization of the user login credentials, wherein the session comprises a session state that tracks user activity and any changes to the user account during the session;
binding the first device to the session state;
saving the first device as a known device;
detecting, via proximity sensor data, activity of the user on a second device;
responsive to detecting the activity on the second device, creating a quick response code for the user;
receiving input of the quick response code by the user from the second device;
in response to input of the quick response code, binding the second device to the session state;
logging the second device into the session with the session state preserved; and
maintaining a common session state in real-time across the first device and second device logged into the session by updating the quick response code on all user devices logged into the session.

18. The computer program product of claim 17, wherein the instructions for detecting the user activity on the second device further comprise instructions:
determining the proximity of the second device to the first device;
determining if the second device is known; and
if the second device us unknown, authenticating user identity before logging the second device into the session.

19. The computer program product of claim 17, wherein authenticating user identity for the second device comprises at least one of:
one-time password;
push notification; or
biometric challenge.

20. The computer program product of claim 17, wherein the quick response code preserves session state information including user login and any data entered by the user.

21. The computer program product of claim 17, wherein the instructions for providing the quick response code to the user further comprises instructions for at least one of:
   providing the quick response code in a text message;
   providing the quick response code in an email message; or
   displaying the quick response code on a web page.

22. The computer program product of claim 17, wherein input of the quick response code from the second device comprises scanning the quick response code with a camera connected to the second device.

23. The computer program product of claim 17, wherein input of the quick response code from the second device comprises tapping the quick response code with a biometric touch.

24. The computer program product of claim 17, wherein if a time lapse is long enough to inactivate the session, scanning and activating the QR code on a user interface resets a clock and reactivates the session without having to manually log in again.

\* \* \* \* \*